(No Model.)

D. YOUNG.
SPEED INDICATOR AND REGISTER.

No. 268,350. Patented Nov. 28, 1882.

WITNESSES:
E. B. Bolton
Geo. Bainton

INVENTOR:
David Young
by his attorneys
Burke, Fraser & Hannett

UNITED STATES PATENT OFFICE.

DAVID YOUNG, OF LONDON, ENGLAND.

SPEED INDICATOR AND REGISTER.

SPECIFICATION forming part of Letters Patent No. 268,350, dated November 28, 1882.

Application filed November 25, 1881. (No model.) Patented in England October 7, 1881, No. 4,359; in Germany November 11, 1881, No. 18,059; in France November 24, 1881, No. 146,012; in Belgium November 26, 1881, No. 56,332: in Italy December 31, 1881, No. 13,565, and in Austria January 1, 1882.

*To all whom it may concern:*

Be it known that I, DAVID YOUNG, residing in London, England, a subject of the Queen of Great Britain, have invented certain new and useful Improvements in Apparatus for Indicating the Speed of Rotating Shafts, of which the following is a specification.

The object of my invention is to produce an improved speed gage or indicator capable of being applied to any rotating shaft to show at a glance the speed at which such shaft is running. For this purpose I provide an ordinary centrifugal ball-governor in which the centripetal force is obtained by means of a spiral or other spring, and which is fixed upon a spindle carried in suitable bearings and driven by being thrust against the end of the shaft the speed of which is to be ascertained; or it may be driven by frictional or other suitable gearing. The sleeve or sliding bush of the governor acts through suitable mechanism upon a spindle bearing an index or pointer, which traverses a graduated dial marked with figures indicative of the various speeds.

I will fully describe my invention with reference to the accompanying drawings, in which—

Figure 1:
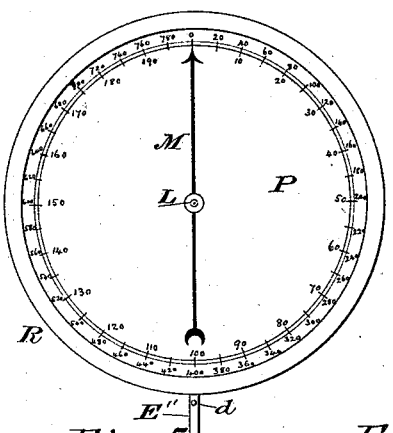
Figure 4:
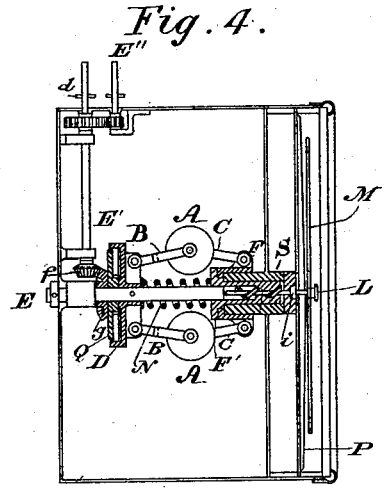
Figure 9:
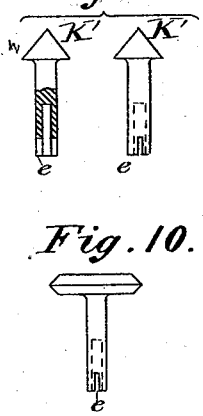
Figure 6:
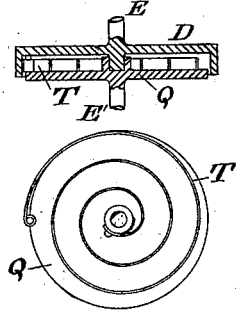
Figure 7:
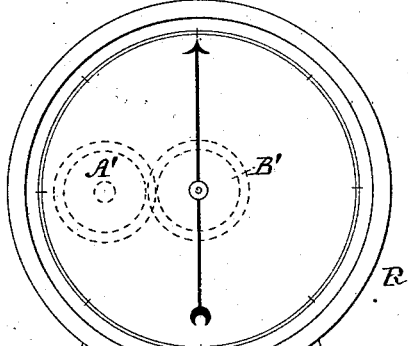
Figures 2, 3:
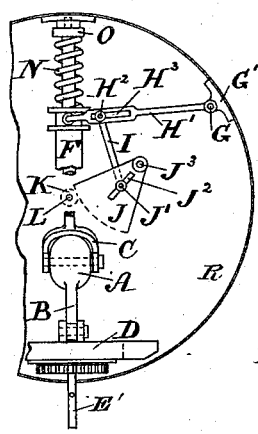
Figure 8:
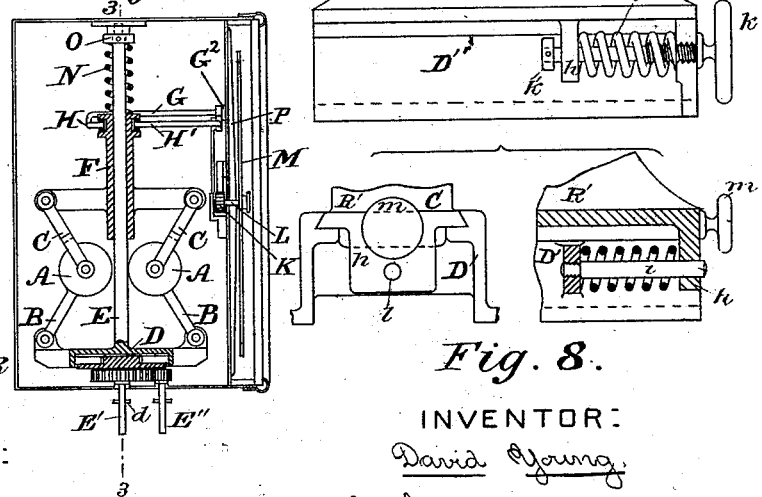

Figure 1 is a front elevation of a portable indicator applicable to any shaft. Fig. 2 is a vertical transverse section thereof. Fig. 3 is a vertical section thereof cut in the plane of the dotted line 3 3 in Fig. 2. Fig. 4 is a view of a modification, being a section corresponding to Fig. 2. Fig. 7 is a front elevation of a stationary indicator, or one applied permanently for indicating the speed of one shaft. Fig. 8 shows a modification thereof, and Figs. 5, 6, 9, and 10 illustrate certain other details and their modifications.

Referring to Figs. 1, 2, and 3, A A are the governor-balls. B B C C are their arms. E is the governor-spindle. D is a fly-wheel fixed thereon, and to which the arms B B are jointed. F is a sliding sleeve mounted on said spindle, to which sleeve the arms C C are jointed. N is a spring which furnishes the centripetal force, it being shown as coiled around the spindle E, re-enforced against a sleeve, O, fixed on the spindle, and pressing against the sleeve F. L is the index-spindle. M is the index or pointer borne thereby. P is the dial, and R is the case inclosing the working parts. G is a small rock-shaft, to which are fixed two arms, H H', which bear rollers on their extremities that enter a circular groove in the sleeve F. l is a connecting-rod, one end of which is jointed to the arm H' by a pin, H², which is capable of adjustment in a slot, H³, in the arm. The other end of the rod I is jointed to a toothed segment, J, by a pin, J', capable of adjustment in a slot, J², in the segment. The teeth of the segment mesh with a pinion, K, on the index-spindle L. The arms B B C C, bearing the governor-balls, form a frame in the nature of a parallelogram, the plane of which is in the axis of the spindle E instead of being at right angles therewith, as heretofore. This construction avoids subjecting these arms to any transverse strain in transmitting the movement of the balls to the index or pointer, thereby rendering the instrument durable and accurate. In my preferred construction the arms B B C C are jointed to the wheel D and sleeve F at points farther out from the axis of the spindle E than the outermost position of the balls A A when most rapidly revolving, so that as the speed of revolution increases and the balls move outwardly the angle formed by the arms B C becomes greater instead of becoming less, as with governors of the ordinary construction. By thus turning the arms inward instead of outward the divisions on the dial may be made of equal length; but the arms B B C C may be turned outward in the ordinary manner, if desired, and in this case the centripetal spring N would be placed upon the spindle E between the fly-wheel D and the sleeve F, and a collar fixed on the spindle E immediately above the said sleeve. The segment J would then be so arranged in relation to the pinion K that the movement of the sleeve F toward the fly-wheel D would cause the required movement of the pinion K and index-spindle L.

The operation is as follows: The instrument being applied to a rotating shaft, the governor-balls fly outward by reason of the centrifugal force and to an extent depending on the rapidity of the revolution, thereby causing the sleeve F to move upward, compressing the spring N, lifting the levers H H', and thence, through the connecting-rod I and segment J, turning the pinion K and spindle L, and causing the index M to traverse the dial until the governor-balls reach a position of equilibrium, when it stops and indicates on the scale the speed of the shaft.

Figure 5:
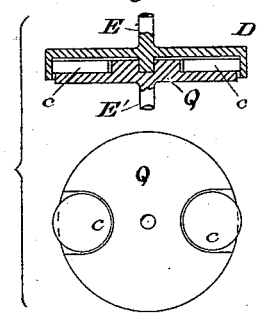

In order to prevent any shock to the instrument when first applied to a shaft, I employ the device shown in Fig. 5. The wheel D is made hollow underneath and terminates the spindle E. Beneath the wheel is a spindle, E', arranged in a line with the spindle E and bearing on its upper end a disk, Q, (shown in plan in the lower view of Fig. 5,) which enters within the hollow of the wheel D. This disk is recessed in its top surface on opposite edges for the reception of the friction disks or rollers c c. The spindle E' is connected to the shaft to be tested, and when it attains sufficient speed the disks c c are thrown by centrifugal force against the flange of the wheel D, thereby causing it to rotate with the spindle E'. Another method is shown in Fig. 6, where a spiral spring, T, is connected at one end to the plate Q and at the other to the wheel D.

Figure 10:
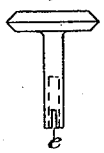

To facilitate the connection of the spindle E' with the shaft to be tested, I provide a center-bit, K', (shown in Fig. 9,) to be slipped over the end of the spindle E' and caused to revolve with it by a pin, d, on the spindle entering a slot, e, in the bit. In Fig. 10 is shown a friction-pulley, which may be fitted in the same manner to the spindle E' and brought in contact with another friction-pulley on the machine-shaft the speed of which is to be taken.

In order that the same instrument may be rendered capable of indicating speeds higher than those which are within the limit of the governor, I provide a spindle, E'', bearing a pinion which meshes with a larger gear on the spindle E', so that for high velocities the spindle E'' may be connected to the shaft to be tested, when it will drive the spindle E' at a slower rate. The spindle E'' is provided with the pin d for engagement with the center-bit in the same manner as the spindle E'. The dial P is marked with two scales, as shown in Fig. 1, one to be read from when the spindle E' is used and the other when the spindle E'' is employed.

In Fig. 4 is shown a modification of my indicator mechanism. The two spindles E' E'' are the same as already described. The former bears a miter-gear, f, which meshes with another miter-gear, g, mounted loosely on the spindle E, which is arranged horizontally in line with the index-spindle L. To the gear g is fixed the disk Q, and the wheel D is fixed on the spindle E. The governor-arms B C bend outwardly instead of inwardly, as before, so that they are most nearly in line with each other when at rest. Hence the centripetal spring N is arranged within the governor between the wheel D and sleeve F, tending to force the latter away from the wheel and straighten out the arms. Between the sleeve F and the spring N is a non-rotating slide, F', which projects into a fixed tubular bearing, S, and is free to move in a line with the axes of the spindles E L, but when at rest is kept pressed to the front by the spring N. The spindle L is provided with screw-threads of steep pitch—say about four threads to the inch—which engage female threads in the slide F'. The spindle L has a collar, i, which prevents its moving longitudinally, but permits it to turn. When this form of my invention is applied to a shaft the centrifugal action draws the sleeve F backward toward the wheel D. The sleeve F pushes back the slide F', which, through the screw-threads on the spindle L, causes the latter to turn and its index to traverse the dial.

In Fig. 7 is shown a stationary form of my indicator, or one designed to be attached permanently for connection with one shaft. A' denotes a friction-pulley fixed on the spindle E or E' of the indicator, and B' another friction-pulley on the shaft the speed of which is to be indicated. The internal mechanism is the same as that already described. The casing R has a downward continuation, R', which fits into suitable guiding-grooves in a small bed-plate, D', and is provided with a lug, h, against which a spiral spring, j, acts to bring the pulley A' into gear with the pulley B'. A bolt, k, screws into the bed-plate D' and passes within the spring j and through the lug h, and a collar, k', is fixed on its end. By turning the bolt the spring may be compressed and the pulley A' drawn away from the pulley B'.

In Fig. 8 is shown a modification of the device shown in Fig. 7. A guide-pin, l, passes through a lug, n, on the casing-frame R', and is screwed into the bed-plate D', and upon it is placed a spiral spring, j, which thus tends to keep the indicator out of gear with the shaft. It may be put in gear at any moment by pressing a button, m, fixed to the frame R'.

It will be obvious that if desired the spindles E, E', or E'' may be permanently attached in any suitable manner to the shaft, so as to indicate its speed constantly.

My invention may be carried out in various ways, and I do not limit myself to the precise details herein set forth; but

What I claim is—

1. A speed-indicator consisting of a centrifugal ball-governor the arms of which are jointed to the spindle and sleeve at points farther from the axis of the spindle than the normal position of the balls, whereby as the speed increases the arms approach parallelism, in combination with the dial, an index or pointer, and mechanism for communicating the motion of the sliding sleeve of the governor to the spindle of the index, substantially as shown and described.

2. The combination of spindle E, balls A A, arms B B C C, sliding sleeve F, centripetal spring N, dial P, index M, index-spindle L, and means for converting longitudinal motion of sleeve F into rotary motion of spindle L, substantially as set forth.

3. The combination of spindle E, balls A A, arms B B C C, sleeve F, spring N, dial P, index M, spindle L, mechanism, substantially as shown, for coverting longitudinal motion of sleeve F into rotary motion of spindle L, with spindle E', and means, substantially as shown, interposed between said spindle and the spindle E for avoiding shock to the mechanism when suddenly rotated, substantially as set forth.

4. The combination of spindle E', disk Q, connected therewith, disks c c, confined in recesses in said disk, and wheel D, having a flange inclosing said disks, with a centrifugal ball-governor driven from said wheel D, and indicating mechanism operated thereby, substantially as set forth.

5. The combination of spindle E, balls A A, arms B B C C, sleeve F, spring N, spindle G, arms H H', link I, segment J, pinion K, spindle L, and index M, substantially as set forth.

6. A speed-indicator consisting of a centrifugal ball-governor, with an index operated thereby inclosed in a case, R, in combination with the frame R' of said case, a fixed bed-plate, D', on which frame R' may slide, and a spring, j, arranged to press said frame to one extremity of its movement, whereby it can at will be pressed in the opposite direction and the indicator connected to or disconnected from the shaft whose speed is to be ascertained, substantially as set forth.

7. The combination of a governor consisting of spindle E, sleeve F thereon, balls A A, arms connecting them to said spindle and sleeve, spring N, coiled around the spindle, with index M, its spindle L, pinion K, segment J, slot J² therein, pin J', adjustably fixed in said slot, and suitable connection between sleeve F and said pin, substantially as set forth.

8. The combination of governor-balls A A, arms B B C C, spindle E, spring N, coiled around said spindle, said spring re-enforced against sleeve O and pressing against sleeve F, spindle L, bearing pinion K, and index or pointer M, toothed segment J, slot J² therein, pin J', adjustable in said slot, and suitable connection between sleeve F and pin J', substantially as set forth.

9. The combination, with a centrifugal ball-governor and index operated thereby, of spindle E', driving said governor and bearing a gear, as shown, and spindle E'', bearing a pinion meshing with said gear, said spindles adapted to receive center-bit K' to facilitate connection with shaft to be tested, substantially as set forth.

In witness whereof I have hereunto signed my name in the presence of two subscribing witnesses.

DAVID YOUNG.

Witnesses:
G. W. PERRY,
A. DIXON.